United States Patent
Hayashi et al.

(10) Patent No.: US 10,097,704 B2
(45) Date of Patent: Oct. 9, 2018

(54) AUTHENTICATION CONTROL APPARATUS, IMAGE READING APPARATUS, AND NON-TRANSITORY COMPUTER READABLE MEDIUM

(71) Applicant: FUJI XEROX CO., LTD., Tokyo (JP)

(72) Inventors: Mitsuo Hayashi, Kanagawa (JP); Toshihide Omori, Kanagawa (JP); Masato Sugii, Kanagawa (JP); Haruhisa Hoshino, Kanagawa (JP); Daigo Yamagishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/348,223

(22) Filed: Nov. 10, 2016

(65) Prior Publication Data

US 2017/0353616 A1 Dec. 7, 2017

(30) Foreign Application Priority Data

Jun. 7, 2016 (JP) .................................. 2016-113466

(51) Int. Cl.
| | |
|---|---|
| G06K 15/00 | (2006.01) |
| H04N 1/00 | (2006.01) |
| G06F 21/31 | (2013.01) |
| H04N 1/44 | (2006.01) |

(52) U.S. Cl.
CPC ......... *H04N 1/00344* (2013.01); *G06F 21/31* (2013.01); *H04N 1/00795* (2013.01); *H04N 1/4413* (2013.01); *H04N 1/4433* (2013.01); *H04N 2201/0039* (2013.01); *H04N 2201/0094* (2013.01)

(58) Field of Classification Search
CPC .. G06F 21/31; H04N 1/00795; H04N 1/4413; H04N 1/4433; H04N 2201/0039; H04N 2201/0094; H04N 1/00344
USPC ........................................................ 358/1.14
See application file for complete search history.

(56) References Cited

U.S. PATENT DOCUMENTS

| | | | | |
|---|---|---|---|---|
| 2005/0044248 | A1* | 2/2005 | Mihira ..................... | G06F 21/31 709/229 |
| 2006/0069918 | A1 | 3/2006 | Takahashi et al. | |
| 2008/0109889 | A1* | 5/2008 | Bartels .................... | H04L 63/10 726/7 |

(Continued)

FOREIGN PATENT DOCUMENTS

JP 2006-102948 A 4/2006

*Primary Examiner* — Neil R McLean
(74) *Attorney, Agent, or Firm* — Oliff PLC

(57) ABSTRACT

An authentication control apparatus includes a first authenticating unit, a second authenticating unit, a controller, and an outputting unit. The first authenticating unit performs first authentication using authentication information stored in association with a memory area. The second authenticating unit performs second authentication using authentication information stored in association with a user. The controller performs control to perform one of authentication operations that are the first authentication and the second authentication when the user uses the memory area. The outputting unit outputs information if the one of the authentication operations performed under the control of the controller does not succeed. The information prompts the user to input authentication information to be used in an authentication operation performed when the user uses the memory area.

10 Claims, 11 Drawing Sheets

(56) References Cited

U.S. PATENT DOCUMENTS

| | | | | |
|---|---|---|---|---|
| 2008/0309975 A1* | 12/2008 | Kondoh | ................ | G06F 21/608 358/1.15 |
| 2011/0279859 A1* | 11/2011 | Hashimoto | ........ | H04N 1/00344 358/1.15 |
| 2013/0286420 A1* | 10/2013 | Tonegawa | ................ | H04N 1/44 358/1.13 |
| 2015/0261481 A1* | 9/2015 | Takenaka | .............. | G06F 3/1285 358/1.15 |

\* cited by examiner

AUTHENTICATION CONTROL APPARATUS, IMAGE READING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-113466 filed Jun. 7, 2016.

BACKGROUND

Technical Field

The present invention relates to an authentication control apparatus, an image reading apparatus, and a non-transitory computer readable medium.

SUMMARY

According to an aspect of the invention, there is provided an authentication control apparatus including a first authenticating unit, a second authenticating unit, a controller, and an outputting unit. The first authenticating unit performs first authentication using authentication information stored in association with a memory area. The second authenticating unit performs second authentication using authentication information stored in association with a user. The controller performs control to perform one of authentication operations that are the first authentication and the second authentication when the user uses the memory area. The outputting unit outputs information if the one of the authentication operations performed under the control of the controller does not succeed. The information prompts the user to input authentication information to be used in an authentication operation performed when the user uses the memory area.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the invention will be described in detail with reference to the attached drawings.

Overall Configuration of Image Forming System

Figure 1:
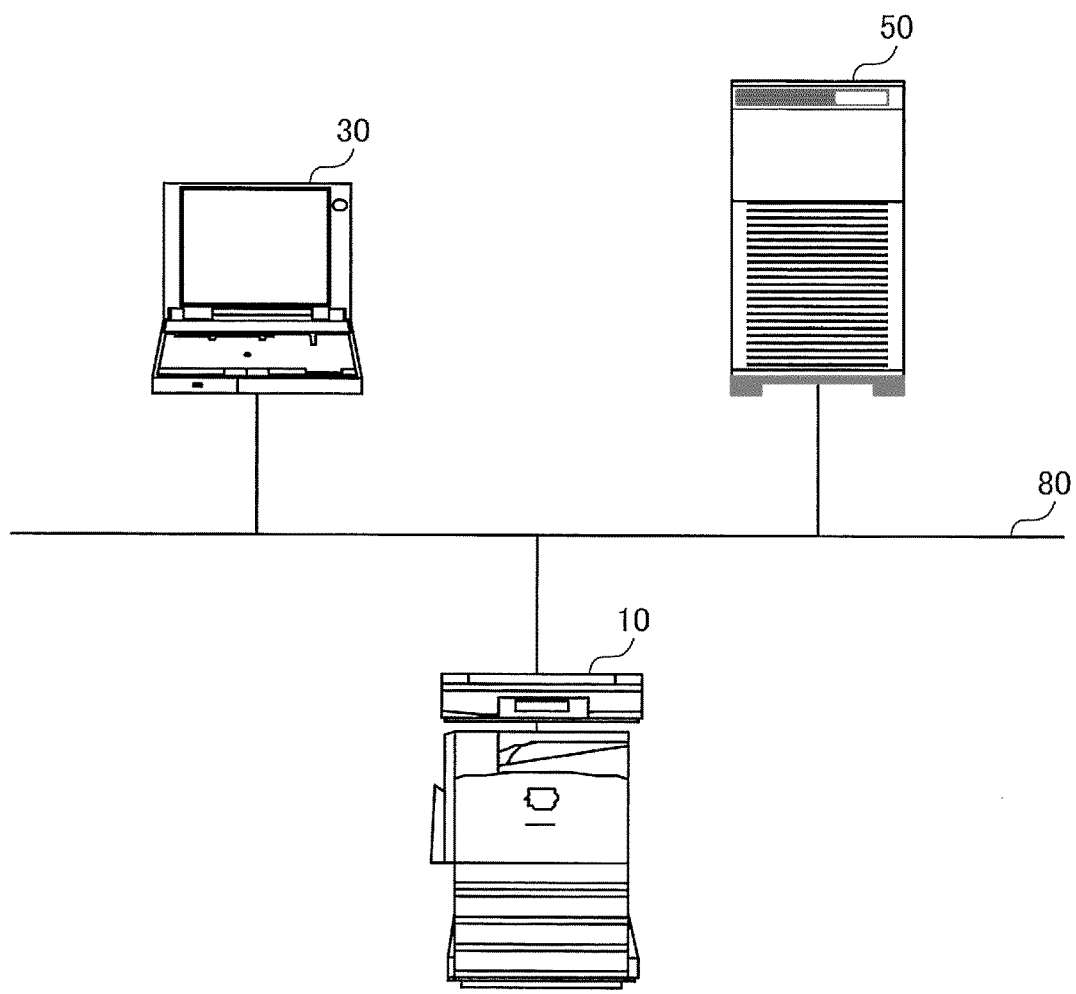
FIG. 1 is a diagram illustrating an example overall configuration of an image reading system to which the exemplary embodiment of the invention is applied.

FIG. 1 is a diagram illustrating an example overall configuration of an image reading system to which the exemplary embodiment is applied. As illustrated in FIG. 1, the image reading system includes an image reading apparatus 10, a terminal apparatus 30, and an authentication server 50 that are connected to each other via a communication network 80. Each of the image reading apparatus 10, the terminal apparatus 30, and the authentication server 50 in FIG. 1 numbers only one but may number two or more.

The image reading apparatus 10 is an apparatus that reads an image from a recording medium having the image recorded thereon, such as paper. The read image is stored in the image reading apparatus 10 as image data or transmitted to the terminal apparatus 30. The image reading apparatus 10 may have only a scanner function of reading an image from a recording medium but, in the following description, also has a printer function of forming an image on a recording medium and a fax machine function of transmitting and receiving image data.

The terminal apparatus 30 is a computer that stores therein the image data transmitted by the image reading apparatus 10.

The authentication server 50 is a server computer that performs authentication when the image reading apparatus 10 accesses the terminal apparatus 30.

The communication network 80 is a communication medium used for information communication between the image reading apparatus 10 and the terminal apparatus 30 and between the image reading apparatus 10 and the authentication server 50 and is, for example, the Internet.

Hardware Configuration of Image Reading Apparatus

Figure 2:
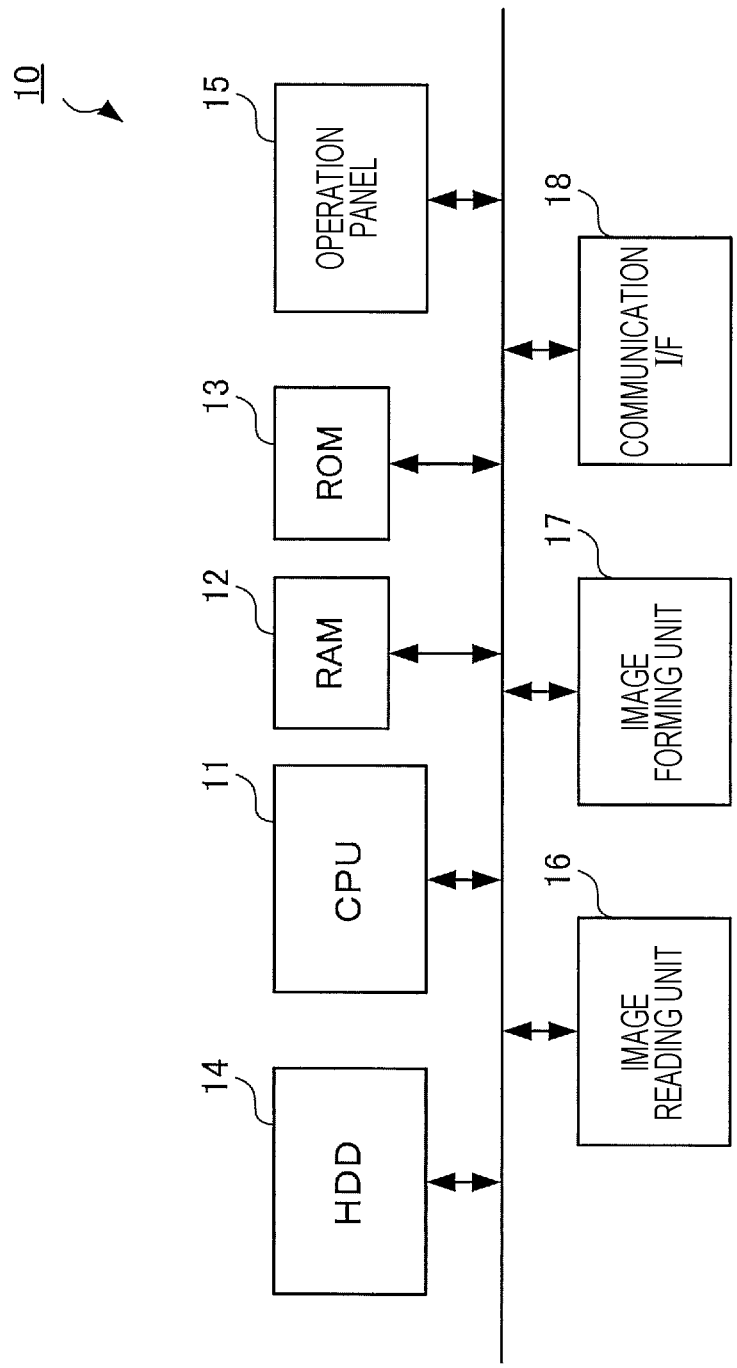
FIG. 2 is a diagram illustrating an example hardware configuration of an image reading apparatus in the exemplary embodiment of the invention.

FIG. 2 is a diagram illustrating an example hardware configuration of the image reading apparatus 10 in the exemplary embodiment. As illustrated in FIG. 2, the image reading apparatus 10 includes a central processing unit (CPU) 11, a random-access memory (RAM) 12, a read-only memory (ROM) 13, a hard disk drive (HDD) 14, an operation panel 15, an image reading unit 16, an image forming unit 17, and a communication interface (hereinafter, referred to as a communication I/F) 18.

The CPU 11 loads various programs and the like stored in the ROM 13 into the RAM 12 and runs the programs. The CPU 11 thereby implements various functions (described later).

The RAM 12 is used as a work memory or the like for the CPU 11.

The ROM 13 stores the various programs and the like run by the CPU 11.

The HDD 14 is, for example, a magnetic disk device used for storing image data read by the image reading unit 16, image data used by the image forming unit 17 for forming an image, and other data.

The operation panel 15 is, for example, a touch panel that displays various pieces of information and receives an input operation performed by a user. The operation panel 15 includes a display on which the various pieces of information are displayed and a location detection sheet on which a location designated using a finger, a stylus pen, or the like is detected. Alternatively, a display and a keyboard may be used instead of the touch panel.

The image reading unit 16 is an example of a reading unit and reads an image recorded on a recording medium such as paper. The image reading unit 16 is, for example, a scanner. A charge coupled device (CCD) scanner and a contact image sensor (CIS) scanner may be used. In the CCD scanner, a CCD receives light in such a manner that the light is radiated from a light source, reflected on a document, and reduced by a lens. In the CIS scanner, a CIS receives light in such a manner that light beams are serially radiated from a light emitting diode (LED) light source and reflected on a document.

The image forming unit 17 forms an image on a recording medium. The image forming unit 17 is, for example, a printer. An electrophotographic printer and an inkjet printer may be used. The electrophotographic printer forms an image in such a manner that toner caused to attach to a photoconductor is transferred onto a recording medium. The inkjet printer forms an image in such a manner that ink is discharged onto a recording medium.

The communication I/F 18 transmits and receives various pieces of information to and from a different apparatus through the communication network 80. The communication I/F 18 transmits the image data read by the image reading unit 16 and causes the image data to be stored in the terminal apparatus 30. Being seen in this light, the communication I/F 18 is an example of a memory.

Exemplary Embodiment Overview

In some cases, the image reading apparatus 10 transfers the read image data to the terminal apparatus 30 by using a server message block (SMB) or a file transfer protocol (FTP), and the data is stored in a folder generated in advance in the terminal apparatus 30. In such cases, the user generally follows a hierarchical path in a list displayed based on SMB browsing or FTP browsing to find a target folder.

The exemplary embodiment may set a folder displayed by default (hereinafter, referred to as a default folder) when the SMB browsing or the FTP browsing is performed. For example, in a conceivable configuration, if an administrator wishes to display image data read by a user in a specific group in only a specific folder or in one of other folders under the folder, the administrator may set the folder as a default folder for the user in the group. In addition, if authentication is needed to access the default folder, whether to store authentication information (a user name and a password) for accessing the default folder may be selected at the time of setting the default folder. Specifically, if the authentication information has been stored, the default folder is accessible using the stored authentication information, and the user does not need to input the authentication information. If the authentication information has not been stored, the user needs to input the authentication information.

The image reading apparatus 10 also allows authentication based on single sign-on (SSO) to be performed when the user accesses a folder in the terminal apparatus 30. In the exemplary embodiment, the SSO refers to a scheme in which if authentication succeeds at the start of the use of the image reading apparatus 10, a folder in the terminal apparatus 30 is accessible without authentication.

In the exemplary embodiment, the two different authentication methods are each usable in the image reading apparatus 10 as an authentication method for accessing the default folder in the terminal apparatus 30 as described above. One of the two authentication methods is authentication (hereinafter, referred to as default-folder authentication) using authentication information for the default folder, and the other is the authentication using the SSO (hereinafter, referred to as SSO authentication). In the exemplary embodiment, how the two different authentication methods are combined to implement authentication for accessing the default folder in the terminal apparatus 30 is considered.

Note that although the authentication server 50 actually performs the authentication in the exemplary embodiment, the image reading apparatus 10 or the terminal apparatus 30 may actually perform the authentication. Accordingly, the phrase "authentication is performed" herein denotes that the authentication is actually performed not only by its own apparatus but also by connecting to a different apparatus.

Functional Configuration of Authentication Control Apparatus

Figure 3:
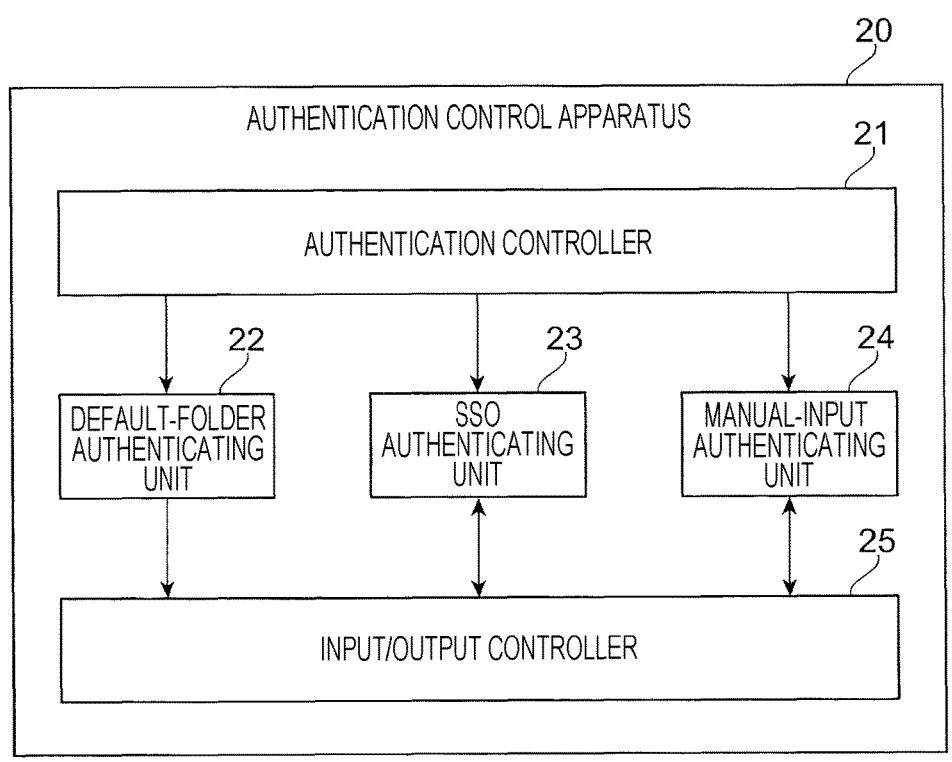
FIG. 3 is a block diagram illustrating an example functional configuration of an authentication control apparatus included in the image reading apparatus in the exemplary embodiment of the invention.

FIG. 3 is a block diagram illustrating an example functional configuration of an authentication control apparatus 20 that controls authentication performed by combining the two different authentication methods. The authentication control apparatus 20 is regarded as an apparatus implemented in such a manner that the CPU 11 (see FIG. 2) of the image reading apparatus 10 loads programs for implementing functional units (described later) into the RAM 12 (see FIG. 2) from, for example, the ROM 13 (see FIG. 2) and runs the programs.

As illustrated in FIG. 3, the authentication control apparatus 20 includes an authentication controller 21, a default-folder authenticating unit 22, a SSO authenticating unit 23, a manual-input authenticating unit 24, and an input/output controller 25.

The authentication controller 21 manages settings regarding authentication. Specifically, whether a default folder has been set is managed. If the default folder has been set, whether authentication is needed to access the default folder is managed. If the authentication is needed to access the default folder, whether authentication information (a user name and a password) for the authentication has been stored in, for example, a memory (not illustrated) of the authentication control apparatus 20 is managed. These may be set by the administrator by using system data. The authentication controller 21 also manages whether the SSO authentication has been set to be performed. The phrase "SSO authentication has been set to be performed" denotes a case that satisfies both of the following conditions. Specifically, the first condition is that the environment allows the SSO authentication to be performed, such as an environment in which authentication is externally performed. The second condition is that the administrator has set the SSO authentication by using the system data. In accordance with these settings, the authentication controller 21 controls operations of the default-folder authenticating unit 22, the SSO authenticating unit 23, and the manual-input authenticating unit 24. In the exemplary embodiment, the authentication controller 21 is provided as an example of a controller that performs control either to perform authentication or not to perform authentication.

Under the control of the authentication controller 21, the default-folder authenticating unit 22 requests the authentication server 50 to perform default-folder authentication. At this time, if the authentication information for the default folder has been stored, the default-folder authenticating unit 22 requests the default-folder authentication by using the authentication information. If the authentication information for the default folder has not been stored, the default-folder authenticating unit 22 either requests the default-folder authentication by using empty information or does not request the default-folder authentication. In the exemplary embodiment, the default folder is used as an example of a memory area, the default-folder authentication is performed as an example of first authentication using authentication information stored in association with the memory area, and the default-folder authenticating unit 22 is provided as an example of a first authenticating unit that performs the first authentication.

Under the control of the authentication controller 21, the SSO authenticating unit 23 requests the authentication server 50 to perform the SSO authentication. At this time, the SSO authenticating unit 23 requests the SSO authentication by using the name of a user to be authenticated. In the exemplary embodiment, the SSO authentication is performed as an example of second authentication using authentication information stored in association with the user, and the SSO authenticating unit 23 is provided as an example of a second authenticating unit that performs the second authentication.

Under the control of the authentication controller 21, the manual-input authenticating unit 24 requests the authentication server 50 to perform authentication using a manual operation (hereinafter, referred to as manual-input authentication). At this time, the manual-input authenticating unit 24 first controls the input/output controller 25 to receive authentication information input by the user from an authentication-information input screen (described later) displayed on the operation panel 15 for manually inputting authentication information. The manual-input authenticating unit 24 then requests the manual-input authentication by using the authentication information received by the input/output controller 25.

The input/output controller 25 performs control to display various screens on the operation panel 15 and receives information input by the user from the various screens. In particular, under the control of the manual-input authenticating unit 24, the input/output controller 25 displays the authentication-information input screen on the operation panel 15 and receives the authentication information input by the user from the authentication-information input screen. In the exemplary embodiment, the input/output controller 25 is provided as an example of an outputting unit that outputs information prompting the user to input authentication information to be used in an authentication operation performed when the user uses the memory area.

These processing units are implemented in such a manner that software and hardware resources cooperate with each other. Specifically, the CPU 11 (see FIG. 2) reads programs implementing the authentication controller 21, the default-folder authenticating unit 22, the SSO authenticating unit 23, the manual-input authenticating unit 24, and the input/output controller 25 from, for example, the ROM 13 (see FIG. 2) to the RAM 12 (see FIG. 2) and runs the programs, and the processing units are thereby implemented.

Screens displayed by the authentication control apparatus 20 on the operation panel 15 will be described.

Figure 4:
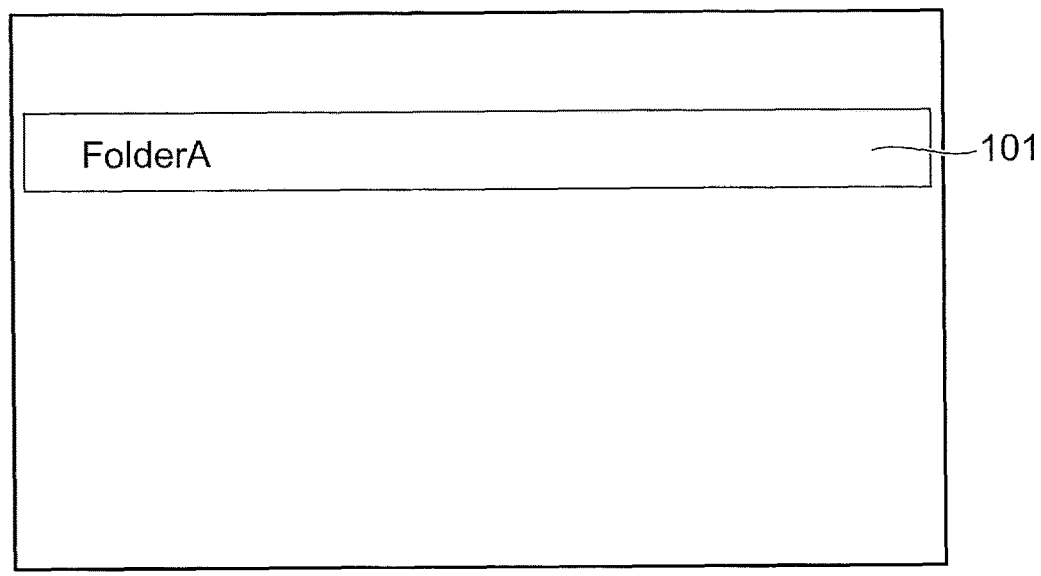
FIG. 4 is a diagram illustrating an example folder screen displayed by the authentication control apparatus included in the image reading apparatus in the exemplary embodiment of the invention.

FIG. 4 illustrates an example folder screen displayed by the authentication control apparatus 20 after the authentication succeeds. In FIG. 4, "FolderA" displayed in a display field 101 indicates a folder specified as a folder in which image data is to be stored. For example, if "FolderA" has been set as a default folder, the authentication control apparatus 20 directly displays the folder screen. If a default folder has not been set, the authentication control apparatus 20 displays the folder screen on the basis of a user operation performed in the following manner. Specifically, the user manually inputs a path to the folder or selects the target folder after following a hierarchical path to the folder. The user thereby specifies "FolderA" as a folder for storing the image data.

Figure 5:
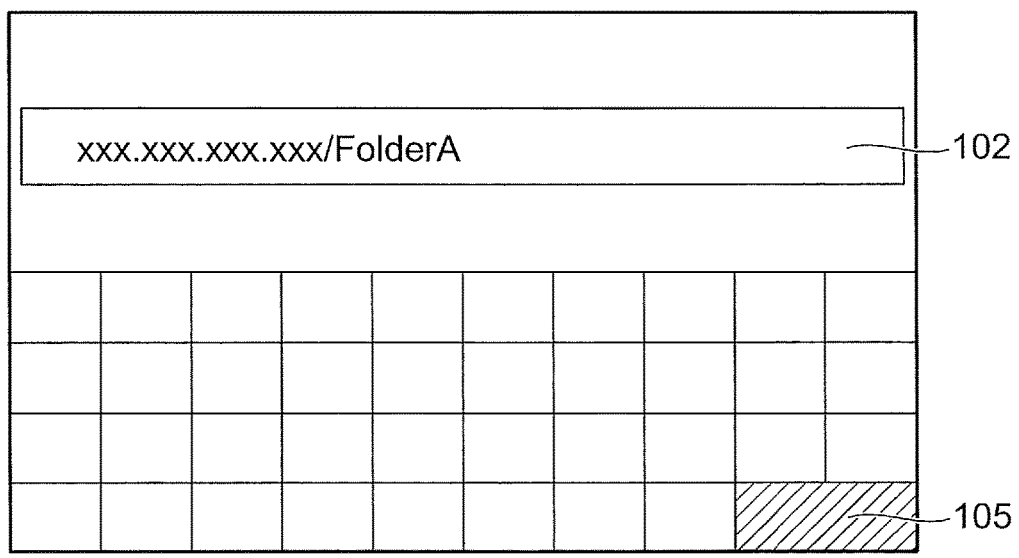
FIG. 5 is a diagram illustrating an example path input screen displayed by the authentication control apparatus included in the image reading apparatus in the exemplary embodiment of the invention.

FIG. 5 illustrates an example path input screen for manually inputting a folder path in the case where a default folder has not been set. In FIG. 5, "xxx.xxx.xxx.xxx/FolderA" input in an input field 102 is a path to a folder directly specified as a folder to which the image data is to be transferred. When the user presses a button 105 on the path input screen, the authentication control apparatus 20 requests the authentication server 50 to perform authentication.

Figure 6:
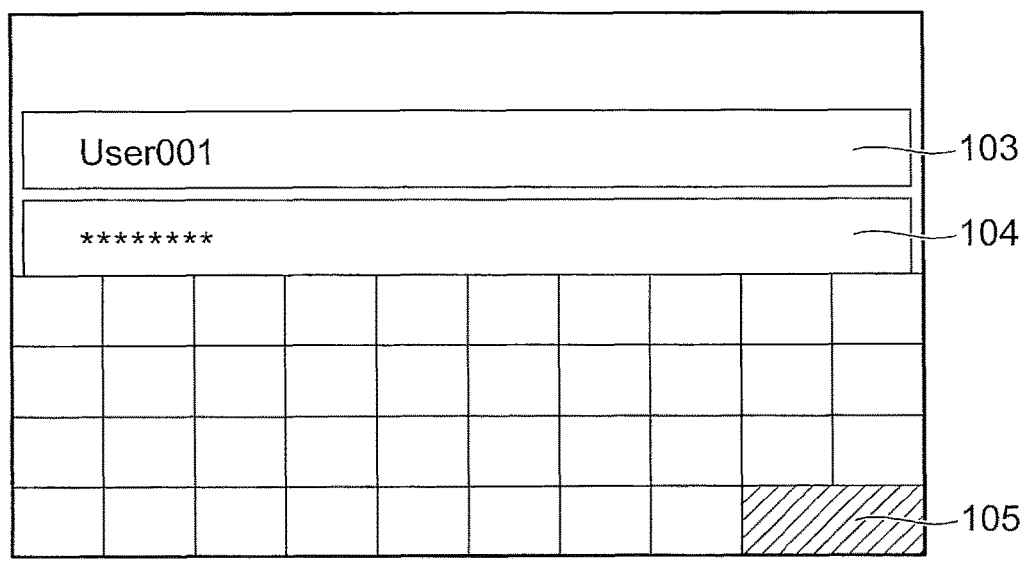
FIG. 6 is a diagram illustrating an example authentication-information input screen displayed by the authentication control apparatus included in the image reading apparatus in the exemplary embodiment of the invention.

FIG. 6 illustrates an example authentication-information input screen for manually inputting authentication information in the case where default-folder authentication or SSO authentication does not succeed. In FIG. 6, "User001" input in an input field 103 is a user name, and "********" input in an input field 104 is a character string indicating that a password input by the user is unrecognizably displayed. When the user presses the button 105 on the authentication-information input screen, the authentication control apparatus 20 requests the authentication server 50 to perform authentication using the manually input authentication information.

Examples of First Operation of Authentication Control Apparatus

In an example of a first operation, the authentication control apparatus 20 performs both the default-folder authentication and the SSO authentication. In this case, the authentication control apparatus 20 operates differently depending on whether the default-folder authentication or the SSO authentication is attempted first. Accordingly, an example operation in which the default-folder authentication is first attempted and an example operation in which the SSO authentication is first attempted will be described separately.

Figure 7:
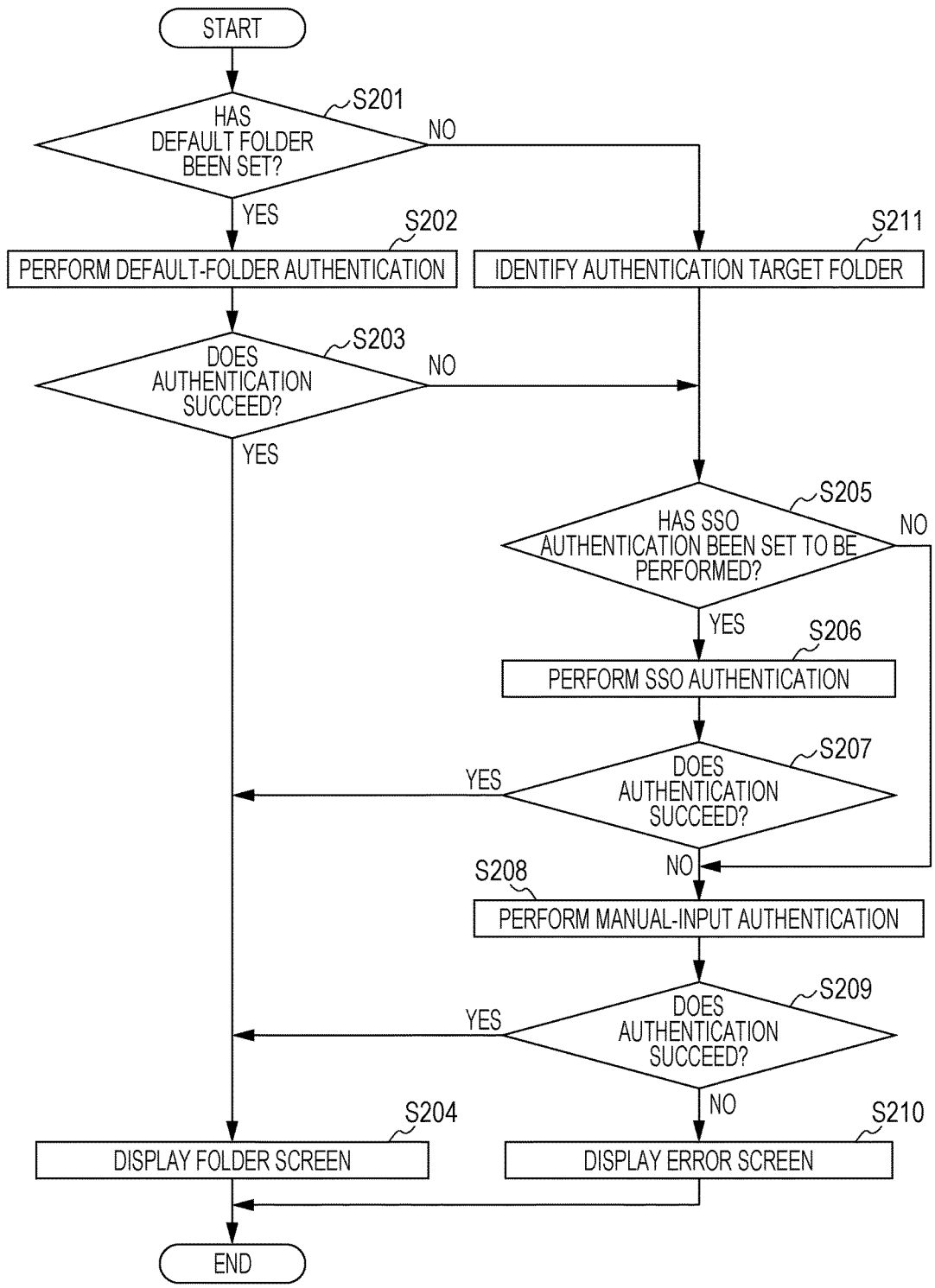
FIG. 7 is a flowchart illustrating an example of a first operation performed by the authentication control apparatus included in the image reading apparatus in the exemplary embodiment of the invention.

FIG. 7 is a flowchart illustrating an example operation in which the default-folder authentication is first attempted. For example, an instruction for specifying a folder for storing image data is given before the image reading unit 16 reads an image, the operation is thereby started.

After the operation is started, the authentication controller 21 of the authentication control apparatus 20 judges whether a default folder has been set (step S201).

First, a case where it is judged that the default folder has been set will be described. In this case, the default-folder authenticating unit 22 performs default-folder authentication (step S202). Specifically, the default-folder authenticating unit 22 specifies a path to the default folder and authentication information for the default folder (a user name and a password) and requests the authentication server 50 to perform the authentication. As described above, the authentication information for the default folder has been stored in some cases and has not been stored in other cases. In step S202, in the former case, the default-folder authenticating unit 22 specifies the stored authentication information and requests the authentication server 50 to perform the authentication, and in the latter case, the default-folder authenticating unit 22 specifies empty information and requests the authentication server 50 to perform the authentication. In the latter case, the authentication will not succeed, but the default-folder authenticating unit 22 requests the authentication server 50 to perform the authentication even in this case. Thereafter, the default-folder authenticating unit 22 judges whether the authentication succeeds on the basis of a reply from the authentication server 50 (step S203). If the default-folder authenticating unit 22 judges that the authentication succeeds, the input/output controller 25 displays the folder screen illustrated in FIG. 4 on the operation panel 15 (step S204). At this time, the folder screen includes the default folder.

If the default-folder authenticating unit 22 judges in step S203 that the authentication does not succeed, the authentication controller 21 judges whether the SSO authentication has been set to be performed (step S205). If the authentication controller 21 judges that the SSO authentication has been set to be performed, the SSO authenticating unit 23 performs the SSO authentication (step S206). Specifically, the SSO authenticating unit 23 specifies the path to the default folder and the user name of a user to be authenticated and requests the authentication server 50 to perform the authentication. Thereafter, the SSO authenticating unit 23 judges whether the authentication succeeds on the basis of a reply from the authentication server 50 (step S207). If the SSO authenticating unit 23 judges that the authentication succeeds, the input/output controller 25 displays the folder screen illustrated in FIG. 4 on the operation panel 15 (step S204). At this time, the folder screen includes the default folder.

If the SSO authenticating unit 23 judges in step S207 that the authentication does not succeed, the manual-input authenticating unit 24 performs manual-input authenticating (step S208). Specifically, the manual-input authenticating unit 24 first instructs the input/output controller 25 to display the authentication-information input screen on the operation panel 15. When the user inputs the authentication information as illustrated in FIG. 6 on the authentication-information input screen displayed under the control of the input/output controller 25, the manual-input authenticating unit 24 specifies the path to the default folder and the input authentication information and requests the authentication server 50 to perform the authentication. Thereafter, the manual-input authenticating unit 24 judges whether the authentication succeeds on the basis of a reply from the authentication server 50 (step S209). If the manual-input authenticating unit 24 judges that the authentication succeeds, the input/output controller 25 displays the folder screen illustrated in FIG. 4 on the operation panel 15 (step S204). At this time, the folder screen includes the default folder. If the manual-input authenticating unit 24 judges in step S209 that the authentication does not succeed, the input/output controller 25 displays an error screen (not illustrated) on the operation panel 15 (step S210).

If the authentication controller 21 judges in step S205 that the SSO authentication has not been set to be performed, the manual-input authenticating unit 24 performs the manual-input authentication (step S208). Specifically, the manual-input authenticating unit 24 first instructs the input/output controller 25 to display the authentication-information input screen on the operation panel 15. When the user inputs the authentication information as illustrated in FIG. 6 on the authentication-information input screen displayed under the control of the input/output controller 25, the manual-input authenticating unit 24 specifies the path to the default folder and the input authentication information and requests the authentication server 50 to perform the authentication. Thereafter, the manual-input authenticating unit 24 judges whether the authentication succeeds on the basis of the reply from the authentication server 50 (step S209). If the manual-input authenticating unit 24 judges that the authentication succeeds, the input/output controller 25 displays the folder screen illustrated in FIG. 4 on the operation panel 15 (step S204). At this time, the folder screen displays the default folder. If the manual-input authenticating unit 24 judges in step S209 that the authentication does not succeed, the input/output controller 25 displays the error screen (not illustrated) on the operation panel 15 (step S210).

A case where it is judged in step S201 that the default folder has not been set will be described. In this case, the input/output controller 25 identifies a folder to be authenticated (referred to as an authentication target folder) (step S211). Specifically, the input/output controller 25 first displays the path input screen on the operation panel 15. When the user inputs a path to the authentication target folder as illustrated in FIG. 5 on the path input screen, the input/output controller 25 receives the input of the authentication target folder. Alternatively, the input/output controller 25 may receive the input of the authentication target folder after the user inputs the address (not illustrated) of the terminal apparatus 30 on the path input screen, follows the hierarchical path, and selects the authentication target folder.

Thereafter, step S205 and the subsequent steps described above for the case where it is judged that the default folder has been set are performed. However, in this case, step S205 and the subsequent steps are performed by using the authentication target folder identified in step S211, instead of the "default folder". That is, the folder specified when the SSO authenticating unit 23 requests the authentication server 50 to perform the SSO authentication in step S206 or when the manual-input authenticating unit 24 requests the authentication server 50 to perform the manual-input authentication in step S208 is not the default folder but the authentication target folder identified in step S211. In addition, the folder screen displayed in step S204 includes the authentication target folder identified in step S211, instead of the default folder.

Figure 8:
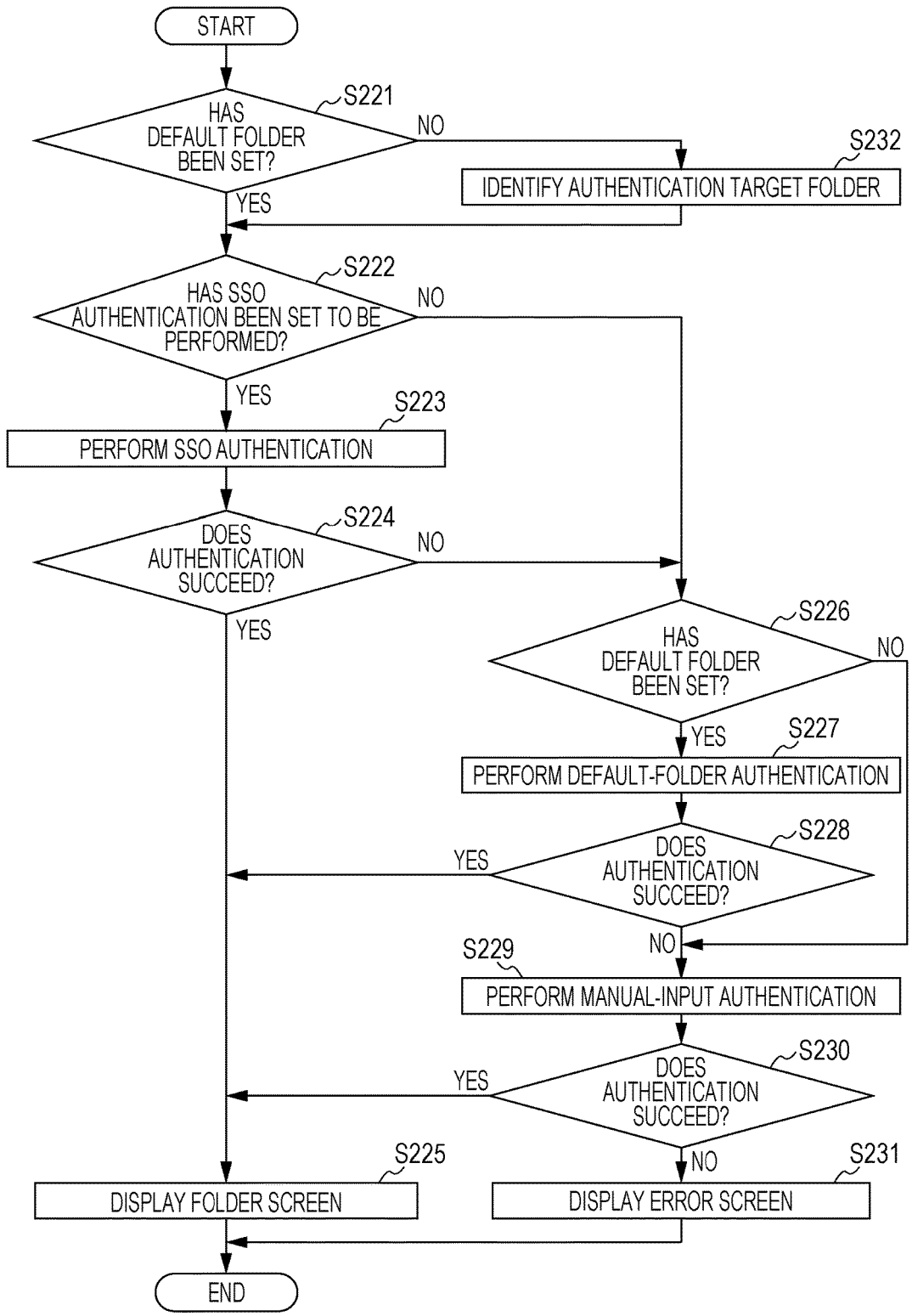
FIG. 8 is a flowchart illustrating an example of the first operation performed by the authentication control apparatus included in the image reading apparatus in the exemplary embodiment of the invention.

FIG. 8 is a flowchart illustrating an example operation in which the case where the SSO authentication is first attempted. For example, an instruction for specifying a folder for storing image data is given before the image reading unit 16 reads an image, the operation is thereby started.

After the operation is started, the authentication controller 21 of the authentication control apparatus 20 judges whether a default folder has been set (step S221).

First, a case where it is judged that the default folder has been set will be described. In this case, the authentication controller 21 judges whether the SSO authentication has been set to be performed (step S222). If the authentication controller 21 judges that the SSO authentication has been set to be performed, the SSO authenticating unit 23 performs the SSO authentication (step S223). Specifically, the SSO authenticating unit 23 specifies a path to the default folder and a user name of a user to be authenticated and requests the authentication server 50 to perform the authentication. Thereafter, the SSO authenticating unit 23 judges whether the authentication succeeds on the basis of a reply from the authentication server 50 (step S224). If the SSO authenticating unit 23 judges that the authentication succeeds, the input/output controller 25 displays the folder screen illustrated in FIG. 4 on the operation panel 15 (step S225). At this time, the folder screen includes the default folder.

If the SSO authenticating unit 23 judges in step S224 that the authentication does not succeed, the authentication controller 21 judges whether the default folder has been set (step S226). If the authentication controller 21 judges that the default folder has been set, the default-folder authenticating unit 22 performs the default-folder authentication (step S227). Specifically, the default-folder authenticating unit 22 specifies the path to the default folder and the authentication information for the default folder (the user name and the password) and requests the authentication server 50 to perform the authentication. As described above, the authentication information for the default folder has been stored in some cases and has not been stored in other cases. In step S227, in the former case, the default-folder authenticating unit 22 specifies the stored authentication information and requests the authentication server 50 to perform the authentication, and in the latter case, the default-folder authenticating unit 22 specifies empty information and requests the authentication server 50 to perform the authentication. In the latter case, the authentication will not succeed, but the default-folder authenticating unit 22 requests the authentication server 50 to perform the authentication even in this case. Thereafter, the default-folder authenticating unit 22 judges whether the authentication succeeds on the basis of a reply from the authentication server 50 (step S228). If the default-folder authenticating unit 22 judges that the authentication succeeds, the input/output controller 25 displays the folder screen illustrated in FIG. 4 on the operation panel 15 (step S225). At this time, the folder screen includes the default folder.

If the default-folder authenticating unit 22 judges in step S228 that the authentication does not succeed, the manual-input authenticating unit 24 performs the manual-input authentication (step S229). Specifically, the manual-input authenticating unit 24 first instructs the input/output controller 25 to display the authentication-information input screen on the operation panel 15. When the user inputs the authentication information as illustrated in FIG. 6 on the authentication-information input screen displayed under the control of the input/output controller 25, the manual-input authenticating unit 24 specifies the path to the default folder and the input authentication information and requests the authentication server 50 to perform the authentication. Thereafter, the manual-input authenticating unit 24 judges whether the authentication succeeds on the basis of a reply from the authentication server 50 (step S230). If the manual-input authenticating unit 24 judges that the authentication succeeds, the input/output controller 25 displays the folder screen illustrated in FIG. 4 on the operation panel 15 (step S225). At this time, the folder screen includes the default folder. If the manual-input authenticating unit 24 judges in step S230 that the authentication does not succeed, the input/output controller 25 displays an error screen (not illustrated) on the operation panel 15 (step S231).

If the authentication controller 21 judges in step S222 that the SSO authentication has not been set to be performed, the authentication controller 21 judges whether the default folder has been set (step S226). If the authentication controller 21 judges that the default folder has been set, the default-folder authenticating unit 22 performs the default-folder authentication (step S227). Specifically, the default-folder authenticating unit 22 specifies the path to the default folder and the authentication information for the default folder (the user name and the password) and requests the authentication server 50 to perform the authentication. As described above, the authentication information for the default folder has been stored in some cases and has not been stored in other cases. In step S227, in the former case, the default-folder authenticating unit 22 specifies the stored authentication information and requests the authentication server 50 to perform the authentication, and in the latter case, the default-folder authenticating unit 22 specifies empty information and requests the authentication server 50 to perform the authentication. In the latter case, the authentication will not succeed, but the default-folder authenticating unit 22 requests the authentication server 50 to perform the authentication even in this case. Thereafter, the default-folder authenticating unit 22 judges whether the authentication succeeds on the basis of the reply from the authentication server 50 (step S228). If the default-folder authenticating unit 22 judges that the authentication succeeds, the input/output controller 25 displays the folder screen illustrated in FIG. 4 on the operation panel 15 (step S225). At this time, the folder screen includes the default folder.

If the default-folder authenticating unit 22 judges in step S228 that the authentication does not succeed, the manual-input authenticating unit 24 performs the manual-input authentication (step S229). Specifically, the manual-input authenticating unit 24 first instructs the input/output controller 25 to display the authentication-information input screen on the operation panel 15. When the user inputs the authentication information as illustrated in FIG. 6 on the authentication-information input screen displayed under the control of the input/output controller 25, the manual-input authenticating unit 24 specifies the path to the default folder and the input authentication information and requests the authentication server 50 to perform the authentication. Thereafter, the manual-input authenticating unit 24 judges whether the authentication succeeds on the basis of the reply from the authentication server 50 (step S230). If the manual-input authenticating unit 24 judges that the authentication succeeds, the input/output controller 25 displays the folder screen illustrated in FIG. 4 on the operation panel 15 (step S225). At this time, the folder screen includes the default folder. If the manual-input authenticating unit 24 judges in step S230 that the authentication does not succeed, the input/output controller 25 displays the error screen (not illustrated) on the operation panel 15 (step S231).

A case where it is judged in step S221 that the default folder has not been set will be described. In this case, the input/output controller 25 identifies an authentication target folder (step S232). Specifically, the input/output controller 25 first displays the path input screen on the operation panel 15. When the user inputs a path to the authentication target folder as illustrated in FIG. 5 on the path input screen, the input/output controller 25 receives the input of the authentication target folder. Alternatively, the input/output controller 25 may receive the input of the authentication target folder after the user inputs the address (not illustrated) of the terminal apparatus 30 on the path input screen, follows the hierarchical path, and selects the authentication target folder.

Thereafter, step S222 and the subsequent steps described above for the case where it is judged that the default folder has been set are performed. However, since the authentication controller 21 judges in step S226 that the default folder has not been set, steps S227 and S228 are not performed. In this case, step S222 and the subsequent steps are performed by using the authentication target folder identified in step S232, instead of the "default folder". That is, the folder specified when the SSO authenticating unit 23 requests the authentication server 50 to perform the SSO authentication in step S223 or when the manual-input authenticating unit 24 requests the authentication server 50 to perform the manual-input authentication in step S229 is not the default folder but the authentication target folder identified in step S232. In addition, the folder screen displayed in step S225 includes the authentication target folder identified in step S232, instead of the default folder.

Example of Second Operation of Authentication Control Apparatus

In the first operation examples, the authentication control apparatus 20 performs both the default-folder authentication and the SSO authentication in the specific case. However, performing both the default-folder authentication and the SSO authentication leads to a large number of accesses to the authentication server 50. If the number of times the result of authentication the authentication server 50 is failure exceeds a set value, the authentication information is likely to be locked. Since the operations of the exemplary embodiment are designed not to make the user conscious that both the default-folder authentication and the SSO authentication are performed, and the locking makes the user feel that there are not many authentication failure results but that the authentication information is suddenly locked.

In contrast, in an example of a second operation, the authentication control apparatus 20 performs up to only one of the default-folder authentication and the SSO authentication. If the result of the authentication is failure, the manual-input authentication is performed. Also in this case, the authentication control apparatus 20 operates differently depending on whether the default-folder authentication or the SSO authentication is attempted first. Accordingly, an example operation in which the default-folder authentication is first attempted and an example operation in which the SSO authentication is first attempted will be described separately. Note that which one of the default-folder authentication and the SSO authentication is attempted first may be set in designing the image reading apparatus 10 or may be set by the administrator as the system data. The description is herein given on the assumption that the former case is employed.

Figure 9:
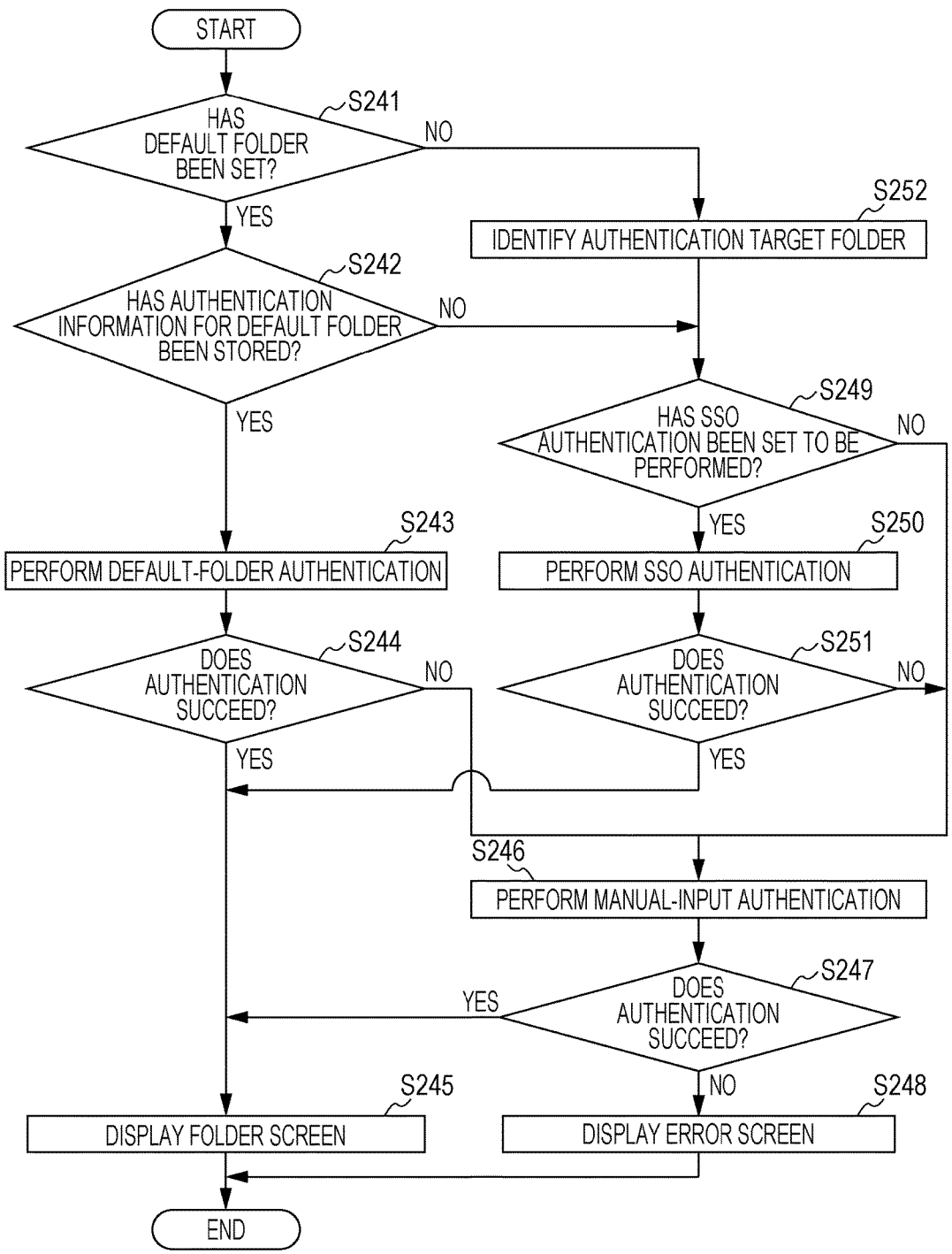
FIG. 9 is a flowchart illustrating an example of a second operation performed by the authentication control apparatus included in the image reading apparatus in the exemplary embodiment of the invention.

FIG. 9 is a flowchart illustrating an example operation in which the default-folder authentication is first attempted. For example, an instruction for specifying a folder for storing image data is given before the image reading unit 16 reads an image, the operation is thereby started.

After the operation is started, the authentication controller 21 of the authentication control apparatus 20 judges whether a default folder has been set (step S241).

First, a case where it is judged that the default folder has been set will be described. In this case, the authentication controller 21 judges whether authentication information for the default folder (a user name and a password) has been stored (step S242). If the authentication controller 21 judges that the authentication information for the default folder has been stored, the default-folder authenticating unit 22 performs the default-folder authentication (step S243). Specifically, the default-folder authenticating unit 22 specifies a path to the default folder and the stored authentication information and requests the authentication server 50 to perform the authentication. Thereafter, the default-folder authenticating unit 22 judges whether the authentication succeeds on the basis of a reply from the authentication server 50 (step S244). If the default-folder authenticating unit 22 judges that the authentication succeeds, the input/output controller 25 displays the folder screen illustrated in FIG. 4 on the operation panel 15 (step S245). At this time, the folder screen includes the default folder.

If the default-folder authenticating unit 22 judges in step S244 that the authentication does not succeed, the manual-input authenticating unit 24 performs the manual-input authentication (step S246). Specifically, the manual-input authenticating unit 24 first instructs the input/output controller 25 to display the authentication-information input screen on the operation panel 15. When a user inputs authentication information as illustrated in FIG. 6 on the authentication-information input screen displayed under the control of the input/output controller 25, the manual-input authenticating unit 24 specifies the path to the default folder and the input authentication information and requests the authentication server 50 to perform the authentication. Thereafter, the manual-input authenticating unit 24 judges whether the authentication succeeds on the basis of a reply from the authentication server 50 (step S247). If the manual-input authenticating unit 24 judges that the authentication succeeds, the input/output controller 25 displays the folder screen illustrated in FIG. 4 on the operation panel 15 (step S245). At this time, the folder screen includes the default folder. If the manual-input authenticating unit 24 judges in step S247 that the authentication does not succeed, the input/output controller 25 displays an error screen (not illustrated) on the operation panel 15 (step S248).

If the authentication controller 21 judges in step S242 that the authentication information for the default folder has not been stored, the authentication controller 21 judges whether the SSO authentication has been set to be performed (step S249). If the authentication controller 21 judges that the SSO authentication has been set to be performed, the SSO authenticating unit 23 performs the SSO authentication (step S250). Specifically, the SSO authenticating unit 23 specifies the path to the default folder and the user name of the user to be authenticated and requests the authentication server 50 to perform the authentication. Thereafter, the SSO authenticating unit 23 judges whether the authentication succeeds on the basis of a reply from the authentication server 50 (step S251). If the SSO authenticating unit 23 judges that the authentication succeeds, the input/output controller 25 displays the folder screen illustrated in FIG. 4 on the operation panel 15 (step S245). At this time, the folder screen includes the default folder.

If the SSO authenticating unit 23 judges in step S251 that the authentication does not succeed, the manual-input authenticating unit 24 performs the manual-input authentication (step S246). Specifically, the manual-input authenticating unit 24 first instructs the input/output controller 25 to display the authentication-information input screen on the operation panel 15. When the user inputs the authentication information as illustrated in FIG. 6 on the authentication-information input screen displayed under the control of the input/output controller 25, the manual-input authenticating unit 24 specifies the path to the default folder and the input authentication information and requests the authentication server 50 to perform the authentication. Thereafter, the manual-input authenticating unit 24 judges whether the authentication succeeds on the basis of the reply from the authentication server 50 (step S247). If the manual-input authenticating unit 24 judges that the authentication succeeds, the input/output controller 25 displays the folder screen illustrated in FIG. 4 on the operation panel 15 (step S245). At this time, the folder screen includes the default folder. If the manual-input authenticating unit 24 judges in step S247 that the authentication does not succeed, the input/output controller 25 displays the error screen (not illustrated) on the operation panel 15 (step S248).

Further, if the authentication controller 21 judges in step S249 that the SSO authentication has not been set to be performed, the manual-input authenticating unit 24 performs the manual-input authentication (step S246). Specifically, the manual-input authenticating unit 24 first instructs the input/output controller 25 to display the authentication-information input screen on the operation panel 15. When the user inputs the authentication information as illustrated in FIG. 6 on the authentication-information input screen displayed under the control of the input/output controller 25, the manual-input authenticating unit 24 specifies the path to the default folder and the input authentication information and requests the authentication server 50 to perform the authentication. Thereafter, the manual-input authenticating unit 24 judges whether the authentication succeeds on the basis of the reply from the authentication server 50 (step S247). If the manual-input authenticating unit 24 judges that the authentication succeeds, the input/output controller 25 displays the folder screen illustrated in FIG. 4 on the operation panel 15 (step S245). At this time, the folder screen displays the default folder. If the manual-input authenticating unit 24 judges in step S247 that the authentication does not succeed, the input/output controller 25 displays the error screen (not illustrated) on the operation panel 15 (step S248).

A case where it is judged in step S241 that the default folder has not been set will be described. In this case, the input/output controller 25 identifies an authentication target folder (step S252). Specifically, the input/output controller 25 first displays the path input screen on the operation panel 15. When the user inputs a path to the authentication target folder as illustrated in FIG. 5 on the path input screen, the input/output controller 25 receives the input of the authentication target folder. Alternatively, the input/output controller 25 may receive the input of the authentication target folder after the user inputs the address (not illustrated) of the terminal apparatus 30 on the path input screen, follows the hierarchical path, and selects the authentication target folder.

Thereafter, step S249 and the subsequent steps described above for the case where it is judged that the default folder has been set are performed. However, in this case, step S249 and the subsequent steps are performed by using the authentication target folder identified in step S252, instead of the "default folder". That is, the folder specified when the SSO authenticating unit 23 requests the authentication server 50 to perform the SSO authentication in step S250 or when the manual-input authenticating unit 24 requests the authentication server 50 to perform the manual-input authentication in step S246 is not the default folder but the authentication target folder identified in step S252. In addition, the folder screen displayed in step S245 includes the authentication target folder identified in step S252, instead of the default folder.

Figure 10:
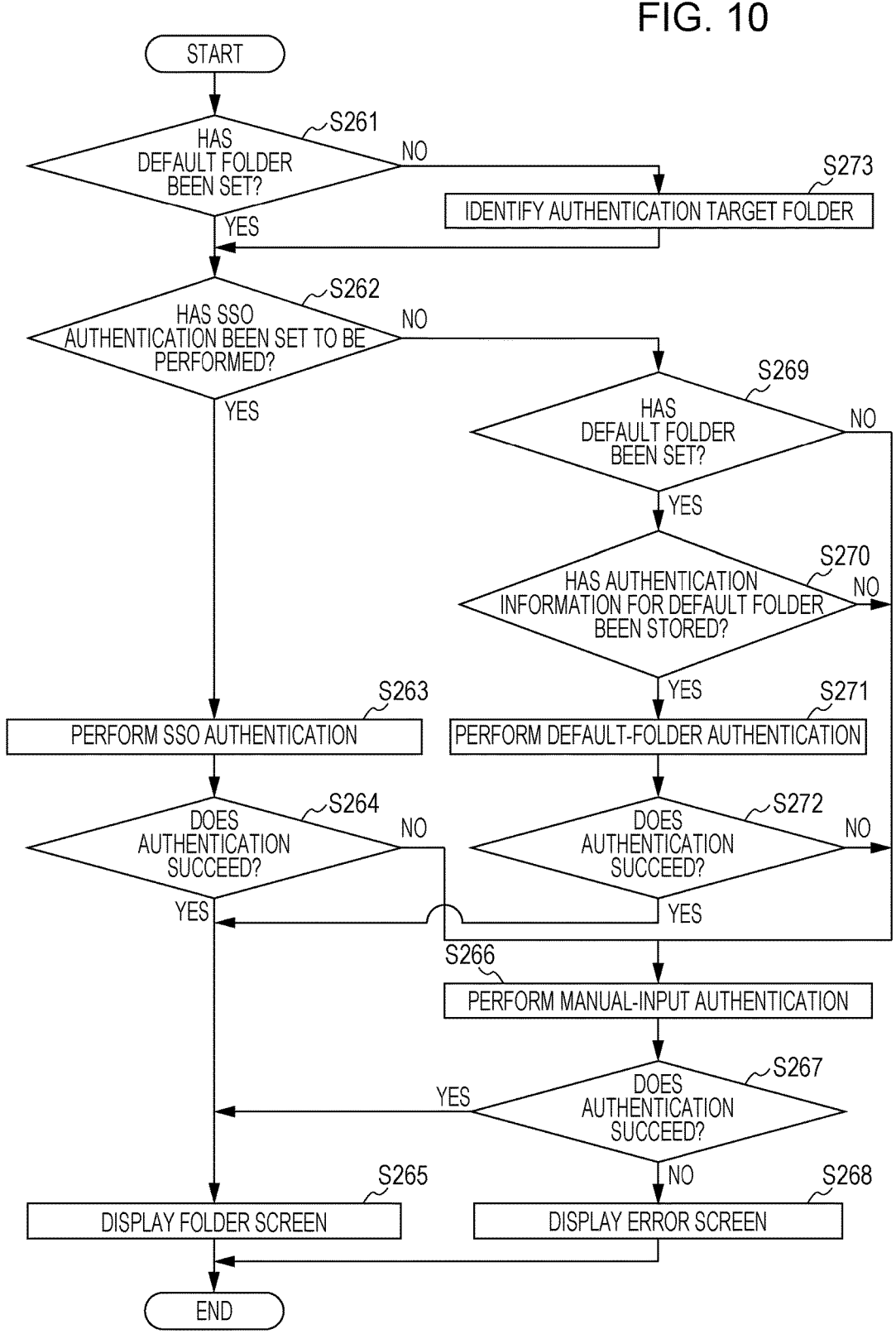
FIG. 10 is a flowchart illustrating an example of the second operation performed by the authentication control apparatus included in the image reading apparatus in the exemplary embodiment of the invention.

FIG. 10 is a flowchart illustrating an example operation in which the SSO authentication is first attempted. For example, an instruction for specifying a folder for storing image data is given before the image reading unit 16 reads an image, the operation is thereby started.

After the operation is started, the authentication controller 21 of the authentication control apparatus 20 judges whether a default folder has been set (step S261).

First, a case where it is judged that the default folder has been set will be described. In this case, the authentication controller 21 judges whether the SSO authentication has been set to be performed (step S262). If the authentication controller 21 judges that the SSO authentication has been set to be performed, the SSO authenticating unit 23 performs the SSO authentication (step S263). Specifically, the SSO authenticating unit 23 specifies a path to the default folder and the user name of a user to be authenticated and requests the authentication server 50 to perform the authentication. Thereafter, the SSO authenticating unit 23 judges whether the authentication succeeds on the basis of a reply from the authentication server 50 (step S264). If the SSO authenticating unit 23 judges that the authentication succeeds, the input/output controller 25 displays the folder screen illustrated in FIG. 4 on the operation panel 15 (step S265). At this time, the folder screen includes the default folder.

If the SSO authenticating unit 23 judges in step S264 that the authentication does not succeed, the manual-input authenticating unit 24 performs the manual-input authentication (step S266). Specifically, the manual-input authenticating unit 24 first instructs the input/output controller 25 to display the authentication-information input screen on the operation panel 15. When the user inputs the authentication information as illustrated in FIG. 6 on the authentication-information input screen displayed under the control of the input/output controller 25, the manual-input authenticating unit 24 specifies the path to the default folder and the input authentication information and requests the authentication server 50 to perform the authentication. Thereafter, the manual-input authenticating unit 24 judges whether the authentication succeeds on the basis of a reply from the authentication server 50 (step S267). If the manual-input authenticating unit 24 judges that the authentication succeeds, the input/output controller 25 displays the folder screen illustrated in FIG. 4 on the operation panel 15 (step S265). At this time, the folder screen includes the default folder. If the manual-input authenticating unit 24 judges in step S267 that the authentication does not succeed, the input/output controller 25 displays an error screen (not illustrated) on the operation panel 15 (step S268).

If the authentication controller 21 judges in step S262 that the SSO authentication has not been set to be performed, the authentication controller 21 judges whether the default folder has been set (step S269). If the authentication controller 21 judges that the default folder has been set, the authentication controller 21 judges whether authentication information for the default folder (a user name and a password) has been stored (step S270). If the authentication controller 21 judges that the authentication information for the default folder has been stored, the default-folder authenticating unit 22 performs the default-folder authentication (step S271). Specifically, the default-folder authenticating unit 22 specifies the path to the default folder and the stored authentication information and requests the authentication server 50 to perform the authentication. Thereafter, the default-folder authenticating unit 22 judges whether the authentication succeeds on the basis of a reply from the authentication server 50 (step S272). If the default-folder authenticating unit 22 judges that the authentication succeeds, the input/output controller 25 displays the folder screen illustrated in FIG. 4 on the operation panel 15 (step S265). At this time, the folder screen includes the default folder.

If the default-folder authenticating unit 22 judges in step S272 that the authentication does not succeed, the manual-input authenticating unit 24 performs the manual-input authentication (step S266). Specifically, the manual-input authenticating unit 24 first instructs the input/output controller 25 to display the authentication-information input screen on the operation panel 15. When the user inputs the authentication information as illustrated in FIG. 6 on the authentication-information input screen displayed under the control of the input/output controller 25, the manual-input authenticating unit 24 specifies the path to the default folder and the input authentication information and requests the authentication server 50 to perform the authentication. Thereafter, the manual-input authenticating unit 24 judges whether the authentication succeeds on the basis of the reply from the authentication server 50 (step S267). If the manual-input authenticating unit 24 judges that the authentication succeeds, the input/output controller 25 displays the folder screen illustrated in FIG. 4 on the operation panel 15 (step S265). At this time, the folder screen includes the default folder. If the manual-input authenticating unit 24 judges in step S267 that the authentication does not succeed, the input/output controller 25 displays the error screen (not illustrated) on the operation panel 15 (step S268).

Further, if the authentication controller 21 judges in step S270 that the authentication information for the default folder has not been stored, the manual-input authenticating unit 24 performs the manual-input authentication (step S266). Specifically, the manual-input authenticating unit 24 first instructs the input/output controller 25 to display the authentication-information input screen on the operation panel 15. When the user inputs the authentication information as illustrated in FIG. 6 on the authentication-information input screen displayed under the control of the input/output controller 25, the manual-input authenticating unit 24 specifies the path to the default folder and the input authentication information and requests the authentication server 50 to perform the authentication. Thereafter, the manual-input authenticating unit 24 judges whether the authentication succeeds on the basis of the reply from the authentication server 50 (step S267). If the manual-input authenticating unit 24 judges that the authentication succeeds, the input/output controller 25 displays the folder screen illustrated in FIG. 4 on the operation panel 15 (step S265). At this time, the folder screen displays the default folder. If the manual-input authenticating unit 24 judges in step S267 that the authentication does not succeed, the input/output controller 25 displays the error screen (not illustrated) on the operation panel 15 (step S268).

A case where it is judged in step S261 that the default folder has not been set will be described. In this case, the input/output controller 25 identifies an authentication target folder (step S273). Specifically, the input/output controller 25 first displays the path input screen on the operation panel 15. When the user inputs a path to the authentication target folder as illustrated in FIG. 5 on the path input screen, the input/output controller 25 receives the input of the authentication target folder. Alternatively, the input/output controller 25 may receive the input of the authentication target folder after the user inputs an address (not illustrated) of the terminal apparatus 30 on the path input screen, follows the hierarchical path, and selects the authentication target folder.

Thereafter, step S262 and the subsequent steps described above for the case where it is judged that the default folder has been set are performed. However, since the authentication controller 21 judges in step S269 that the default folder has not been set, steps S270 to 272 are not performed. In this case, step S262 and the subsequent steps are performed by using the authentication target folder identified in step S273, instead of the "default folder". That is, the folder specified when the SSO authenticating unit 23 requests the authentication server 50 to perform the SSO authentication in step S263 or when the manual-input authenticating unit 24 requests the authentication server 50 to perform the manual-input authentication in step S266 is not the default folder but the authentication target folder identified in step S273. In addition, the folder screen displayed in step S265 includes the authentication target folder identified in step S273, instead of the default folder.

Example of Third Operation of Authentication Control Apparatus

Also in an example of a third operation, both the default-folder authentication and the SSO authentication are performed as in the examples of the first operation. However, various ways of reducing the number of accesses to the authentication server 50 are devised in the example of the third operation. In the example of the third operation, the order in which the default-folder authentication and the SSO authentication are attempted is fixed, and the administrator is freed from the burden of determining which one of the default-folder authentication and the SSO authentication is to be attempted first.

Figure 11:
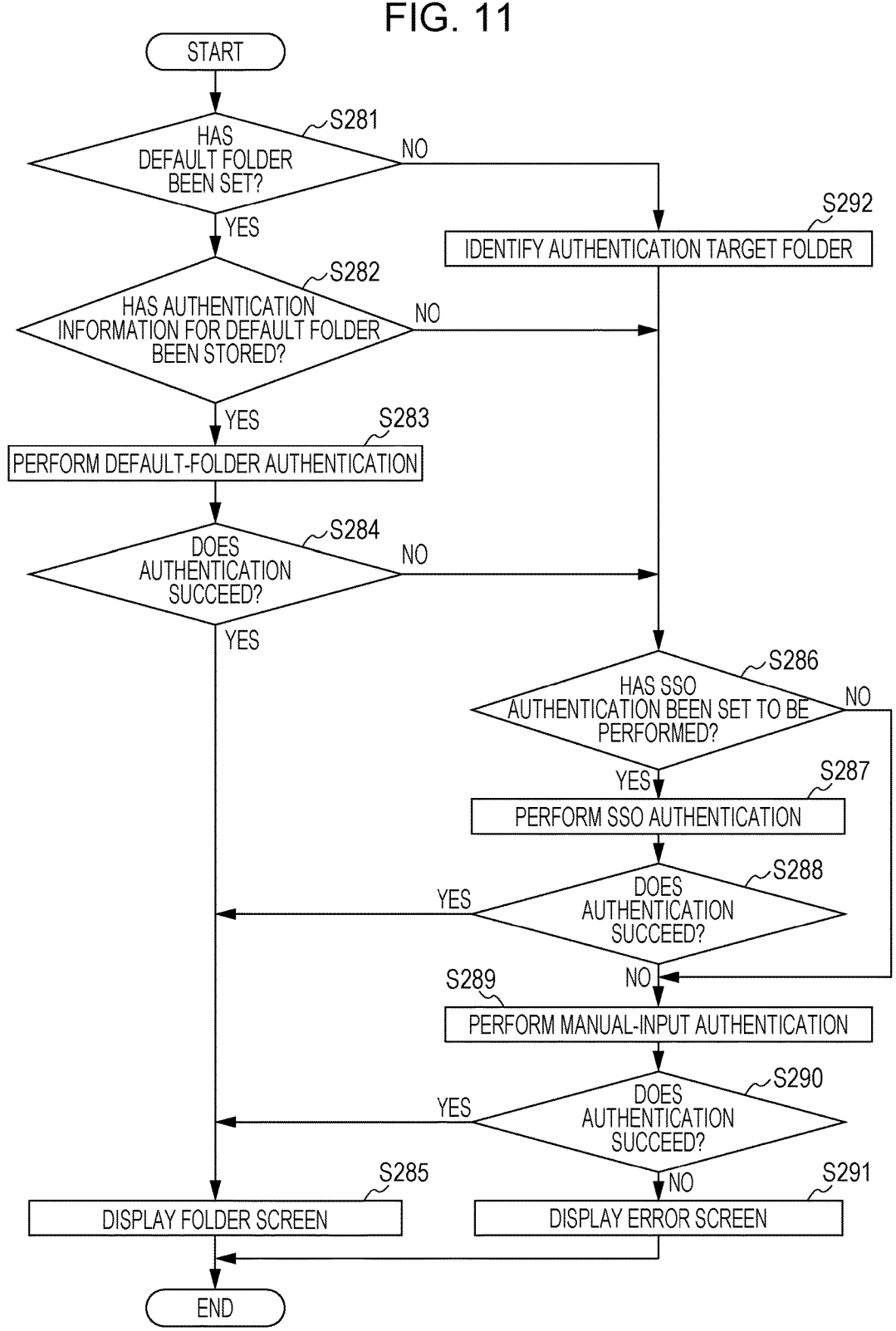
FIG. 11 is a flowchart illustrating an example of a third operation performed by the authentication control apparatus included in the image reading apparatus in the exemplary embodiment of the invention.

FIG. 11 is a flowchart illustrating the example of the third operation. For example, an instruction for specifying a folder for storing image data is given before the image reading unit 16 reads an image, the operation is thereby started.

After the operation is started, the authentication controller 21 of the authentication control apparatus 20 judges whether a default folder has been set (step S281).

First, a case where it is judged that the default folder has been set will be described. In this case, the authentication controller 21 judges whether authentication information for the default folder (a user name and a password) has been stored (step S282). If the authentication controller 21 judges that the authentication information for the default folder has been stored, the authentication control apparatus 20 performs step S283 and subsequent steps. Step S283 and the subsequent steps are the same as those in step S202 and the subsequent steps in FIG. 7.

If the authentication controller 21 judges in step S282 that the authentication information for the default folder has not been stored, the authentication control apparatus 20 performs step S286 and subsequent steps. Step S286 and the subsequent steps are the same as those in step S205 and the subsequent steps in FIG. 7. That is, in the example of the third operation, if the authentication information for the default folder has not been stored, the processing proceeds to the SSO authentication or the manual-input authentication. In the examples of the first operation, even if it is judged that the authentication information for the default folder has not been stored, the default-folder authentication is attempted after the empty information is specified as the authentication information. The example in the third operation exerts a smaller number of accesses to the authentication server 50 than the number of accesses in the examples of the first operation and is thus different from the examples of the first operation in this point. Note that even if the authentication information for the default folder has not been input, that is, even if authentication is not needed to access the default folder, the default-folder authentication may be attempted in such a manner that the empty information is specified as the authentication information.

A case where it is judged in step S281 that the default folder has not been set will be described. In this case, the authentication control apparatus 20 performs step S292 and subsequent steps. Step S292 and the subsequent steps are the same as those in step S211 and the subsequent steps in FIG. 7.

In the example of the third operation, the order in which the default-folder authentication and the SSO authentication are attempted is fixed, that is, the default-folder authentication is first attempted, and the SSO authentication is then attempted. However, the order is not limited thereto. The order may be fixed, that is, the SSO authentication may be first attempted, and the default-folder authentication may then be attempted.

In the example of the third operation, one of the authentication methods that has an authentication failure result is not attempted in the same session. The phrase "in the same session" denotes a period of time from opening of a browsing screen to closing of the browsing screen. The browsing screen is an example of a screen operated for selecting a memory area. For example, consider a case where a user accesses a default folder in the terminal apparatus 30 and then accesses a different folder of a different terminal apparatus without closing the browsing screen. In this case, the following configuration may be employed. If the default-folder authentication and the SSO authentication have been performed when accessing the default folder but have had failure results, and if the processing has proceeded to the manual-input authentication, the default-folder authentication and the SSO authentication are not performed again when accessing the different folder, and the manual-input authentication is directly performed. This also saves the number of accesses to the authentication server 50 in the example of the third operation.

The default-folder authentication and the SSO authentication are not performed again in the foregoing description, but another configuration may be employed. If the default-folder authentication has been performed when accessing the default folder but has had a failure result, and if the processing has proceeded to the SSO authentication, the default-folder authentication is not performed again when accessing the different folder, and the SSO authentication is directly performed. This configuration is also applicable to the example of the first operation illustrated in FIG. 7 in which the default-folder authentication is attempted first.

The default-folder authentication and the SSO authentication are not performed again in the foregoing description, but still another configuration may be employed. If the SSO authentication has been performed when accessing the default holder but has had a failure result, and if the processing has proceeded to the default-folder authentication, the SSO authentication is not performed again when accessing the different folder, and the default-folder authentication is performed directly. This configuration is also applicable to the example of the first operation illustrated in FIG. 8 in which the SSO authentication is attempted first.

In the example of the third operation, if the SSO authentication has been set to be performed from a screen for setting whether to set the SSO authentication, a message prompting the administrator not to set the authentication information for the default folder (the user name and the password) may be displayed. Since the administrator who has set the SSO authentication naturally wishes SSO connection, storing the authentication information for the default folder leads to an unnecessary access for the administrator. Although the condition in which the authentication server 50 is locked depends on the security policy or the like employed for the authentication server 50 and the network, for example, in some cases, three types of data are transmitted in accordance with the setting of the authentication server 50 and three retries are performed for each type of data during one authentication operation. In such cases, reducing even one access to the authentication server 50 is benefitial1. To reduce unnecessary accesses to the authentication server 50 and to reduce setting errors such as forgetting to perform a setting to reduce unnecessary accesses, displaying the message as described above is useful.

Program

The process executed by the authentication control apparatus 20 in the exemplary embodiment is provided by using a program such as application software.

The program implementing the exemplary embodiment is regarded as a program causing a computer to execute a process for controlling authentication. The process includes: performing first authentication using authentication information stored in association with a memory area; performing second authentication using authentication information stored in association with a user; performing control to perform one of authentication operations that are the first authentication and the second authentication when the user uses the memory area; and outputting information that prompts the user to input authentication information if one of the authentication operations that is performed under the control of the controller does not succeed, the authentication information being used in an authentication operation performed when the user uses the memory area.

Note that the program implementing the exemplary embodiment may be provided not only through the communication medium but also in such a manner as to be stored in a recording medium such as a compact disc read-only memory (CD-ROM).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An authentication control apparatus comprising:
   a first authenticating unit that performs first authentication using first authentication information stored in association with a memory area;
   a second authenticating unit that performs second authentication using second authentication information stored in association with a user, the first authentication information being different from the second authentication information;
   a controller that, after the user begins using the memory area, performs control to perform one of the first authentication and the second authentication depending on whether a default folder has been set; and
   an outputting unit that outputs information if the one authentication performed under the control of the controller does not succeed, the information prompting the user to input authentication information to be used in an authentication operation performed when the user uses the memory area.

2. The authentication control apparatus according to claim 1, wherein the controller performs control to perform the first authentication as the one authentication, and if the first authentication does not succeed, the controller performs control to perform the second authentication.

3. The authentication control apparatus according to claim 1,
wherein the controller performs control to perform the second authentication as the one authentication, and if the second authentication does not succeed, the controller performs control to perform the first authentication.

4. The authentication control apparatus according to claim 1,
wherein if the first authentication information to be used in the first authentication has not been stored, the controller performs control not to perform the first authentication but to perform the second authentication as the one authentication.

5. The authentication control apparatus according to claim 1,
wherein if the second authentication has been set not to be performed, the controller performs control not to perform the second authentication but to perform the first authentication as the one authentication.

6. The authentication control apparatus according to claim 1,
wherein in a period of time from opening of a screen operated for selecting the memory area to closing of the screen, if the controller has performed control to perform the first authentication and has not had a successful result, the controller performs control not to again perform the first authentication but to perform the second authentication as the one authentication.

7. The authentication control apparatus according to claim 1,
wherein in a period of time from opening of a screen operated for selecting the memory area to closing of the screen, if the controller has performed control to perform the second authentication and has not had a successful result, the controller performs control not to again perform the second authentication but to perform the first authentication as the one authentication.

8. The authentication control apparatus according to claim 1,
wherein if the performed one authentication is the first authentication, the user does not need to input the first authentication information.

9. An image reading apparatus comprising:
a reading unit that reads an image from a recording medium on which the image is recorded;
a first authenticating unit that performs first authentication using first authentication information stored in association with a memory area;
a second authenticating unit that performs second authentication using second authentication information stored in association with a user, the first authentication information being different than the second authentication information;
a controller that, after the user begins using the memory area, performs control to perform one of the first authentication and the second authentication depending on whether a default folder has been set; and
a memory that stores the image read by the reading unit in the memory area if the one authentication performed under the control of the controller succeeds.

10. A non-transitory computer readable medium storing a program causing a computer to execute a process for controlling authentication, the process comprising:
performing first authentication using first authentication information stored in association with a memory area;
performing second authentication using second authentication information stored in association with a user, the first authentication information being different than the second authentication information;
after the user begins using the memory area, performing control to perform one of the first authentication and the second authentication depending on whether a default folder has been set; and
outputting information if the one authentication performed under the control of the controller does not succeed, the information prompting the user to input authentication information to be used in an authentication operation performed when the user uses the memory area.

* * * * *